United States Patent [19]

Atkinson

[11] Patent Number: 4,909,852

[45] Date of Patent: * Mar. 20, 1990

[54] TREATMENT OF TITANIUM DIOXIDE AND OTHER PIGMENTS TO IMPROVE DISPERSIBILITY

[76] Inventor: George K. Atkinson, 1820 N. Seventh Ave., Laurel, Miss. 39440

[*] Notice: The portion of the term of this patent subsequent to Jul. 8, 2003 has been disclaimed.

[21] Appl. No.: 188,430

[22] Filed: Apr. 29, 1988

Related U.S. Application Data

[60] Division of Ser. No. 877,234, Jun. 23, 1986, Pat. No. 4,741,780, which is a continuation-in-part of Ser. No. 700,891, Feb. 11, 1985, Pat. No. 4,599,114.

[51] Int. Cl.$^4$ ................................................ C09C 1/36
[52] U.S. Cl. ..................................... 106/448; 106/436; 106/437; 106/477; 106/493; 106/504; 252/357; 260/404.5
[58] Field of Search ............... 106/436, 437, 448, 477, 106/493, 504; 260/404.5; 252/357

[56] References Cited

U.S. PATENT DOCUMENTS

| | | |
|---|---|---|
| 3,536,510 | 10/1970 | Allen et al. .................... 106/437 |
| 3,674,528 | 7/1972 | Bronson ......................... 106/437 |
| 3,808,022 | 4/1974 | Twist et al. ..................... 106/437 |
| 4,089,699 | 5/1978 | Blackburn et al. ............. 523/200 |
| 4,154,622 | 5/1979 | Momoei et al. ................ 106/504 |
| 4,165,239 | 8/1979 | Linden et al. .................. 106/448 |
| 4,209,430 | 6/1980 | Weber ............................ 106/447 |
| 4,221,606 | 9/1980 | Funatsu et al. ................. 106/411 |
| 4,235,768 | 11/1980 | Ritter et al. .................... 523/205 |
| 4,277,288 | 7/1981 | Lawrence et al. .............. 106/437 |
| 4,375,989 | 3/1983 | MäKinen ........................ 106/438 |

Primary Examiner—A. Lionel Clingman
Assistant Examiner—Willie J. Thompson
Attorney, Agent, or Firm—Herbert M. Hanegan

[57] ABSTRACT

This invention is concerned with the treatment of particulate titanium dioxide and other pigments with a surfactant compound which serves to enhance its employment in pigmented and/or filled paints and plastics, paper making compositions and in reinforced plastic composite compositions.

16 Claims, No Drawings

4,909,852

TREATMENT OF TITANIUM DIOXIDE AND OTHER PIGMENTS TO IMPROVE DISPERSIBILITY

CROSS REFERENCE TO RELATED APPLICATION

This is a divisional of co-pending application Ser. No. 877,234, filed on June 23, 1986, now U.S. Pat. No. 4,741,780, which is a continuation-in-part of copending application Ser. No. 700,891 filed Feb. 11, 1985 now U.S. Pat. No. 4,599,114.

This invention relates to surfactant treated particulate titanium dioxide and other pigments. More particularly, this invention is concerned with surfactant treated titanium dioxide and other particulate materials readily employable in coating compositons, plastic molding compositions and reinforced plastic composite compositions.

Industrial pigment particles agglomerate or cake together into hard packed clusters during the drying operation near the end of the manufacturing process. Forces holding pigment clusters together are not large in many cases but are yet large enough that the pigment user, those who incorporate industrial pigment into their products such as paints and plastics and the like, are required to subject industrial pigments to a milling operation in which the agglomerates are sheared under stress into particles of suitable smallness and homogenized into the matrix or product which incorporates them. The process is dispersion.

Pigment dispersion is a bottleneck, a limiting requirement, and the most expensive operation in terms of energy and time in manufacturing processes which employ pigments. This present invention is concerned with the employment of surfactants for the surface treatment of pigments during the pigment manufacturing process in order to provide pigments of improved dispersibility in subsequent manufacturing processes and in some cases, to provide improvements in certain important aspects of products incorporating these surface treated pigments.

The surface treatment of pigments can provide the following beneficial primary effects:

1. The total number of agglomerates is reduced.
2. Any agglomerates that are present are more easily broken up since their mechanical strength is reduced.
3. Pigment particle wettability is improved due to a lowering of the intefacial tension between the pigment surface and the application medium.
4. Wettability of the pigment particles is also improved due to the liberation of the free energy of solution of the coating agent on the pigment surface.

Pigments, their preparation and properties are described in volumes I, II and III of the book "Pigment Handbook" published by John Wiley & Sons, Inc. The uses, preparation and characterization of pigments is further described in the various units of "The Federation Series On Coating Technology" published by the Federation Of Societies For Coating Technology.

German Pat. Nos. 889,042 and 930,998 teach the use of surface-active substances as emulsifiers together with oils in the manufacture of water-insoluble azo-dyestuffs having a soft grain.

U.S. Pat. No. 3,120,508 discloses that water-insoluble azo-dyestuffs having a particularly high tinctorial strength can be prepared by adding during the coupling cationic surfaceactive compounds without simultaneously using oils.

Cationic surface-active compounds are described in the book "Surface-Active Agents and Detergents" by A.M. Schwartz, J.W. Perry and J. Berch, vol. II (1958), pages 103 to 119.

Suitable cationic surface-active substances are, for example, long-chained aliphatic amino compounds that contain about 10 to 18 carbon atoms, or the salts of such nitrogen compounds with carboxylic acids, such for example, as formic acid, acetic acid, oleic acid, tallow fatty acid, lactic acid or mineral acids, for example, hydrochloric acid. Fatty amines are for example, coconut oil amine, oleyl amine, stearyl amine, and tallow fat amine, as well as the secondary and tertiary amines or quaternary ammonium compounds derived therefrom that may carry as substituents aliphatic, aromatic or oxethylated radicals, for example, alkyldimethyloxethylammonium chlroide. Oxethylated fatty amines in their secondary, tertiary or quaternary form are also suitable. Also useful are the condensation products of long-chained, in some case also unsaturated, carboxylic acids with amines, in particular alkylenediamines, alkylenetriamines, or alkylenepolyamines cnntaining alkylene radicals of low molecular weight, for example, ethylene diamine, diethylene triamine, etc., as well as the secondary, tertiary or quaternary amines formed by alkylation of the condensation products, especially in the form of their water-soluble salts with the above-mentioned acids. Further, there may be used fatty acid amides and esters of long-chained carboxylic acids with alkylol amines, for example, triethanolaminoleate, stearate, and the like, further also cyclical, nitrogen-containing compounds, for example, long-chained derivatives of morpholine, imidazoline, piperidine, piperazine or pyridine. The above-mentioned amino compounds are used preferably in the form of their carboxylic or hydrochloric salts.

British Patent No. 1,080,115 discloses the use of primary long chain alkyl amines for treating pigments improving their dispersibility In the past organosilicon compounds have been employed in the treatment of inorganic oxide surfaces such as inorganic oxide films, particulate fillers and pigments, and fibers (such as glass fibers, aluminum fibers and steel fibers). Aluminum and steel fibers are considered oxide surfaces because they are oxidized even though their sub-surfaces are not. The typical prior art treatment involved coating such surfaces with hydrolyzate (and-/or condensate of hydrolyzate) of an organofunctional hydrolyzable silane. Generally such surface coating compounds are termed coupling agents and/or adhesion promoters. Another conventional technique for supplying the coupling agent to the inorganic oxide surface is by the integral blending technique. This technique involves adding to the resin medium the desired amount of the coupling agent and providing the medium in contact with the inorganic oxide surface by supplying the latter as a particulate filler or fiber to the medium or supplying the medium with the coupling agent to a continuous surface in the form of a film, fabric, foil or other shapes, wherein the coupling agent migrates within the medium to contact the surface or surfaces, react thereat and couple with the medium under the molding, curing and other shaping conditions.

As a rule, coupling agents enhance the chemical bonding between the medium and the inorganic oxide substrate thereby to achieve improved adhesion between them. This could affect the strength properties of the composite of the plastic or resin associated with the inorganic oxide substrate or substrates.

Coupling agents have been extensively employed in the surface treatment of inorganic particulate materials such as fillers, pigments, and materials which also act to reinforce the resin or plastic materials in which it is incorporated such as asbestos fibers and relatively short length glass fibers, such as staple glass fibers. All of these have been benefically treated by certain coupling agents. However, in only rare instances do the coupling agents provide benefits other than increased adhesion. It is traditionally accepted that organosilanes add essentially no benefits to and generally detract from the properties of carbon black when employed in paints, dyes, rubber plastics, etc., even though carbon black contains chemisorbed oxygen.

There is described herein the use of surfactants which have the capability of increasing the dispersibility of titanium dioxide and other pigments to which it is supplied. The utilization of these surfactants on titanium dioxide results, in many cases, in improved strength properties for the composite in which it is incorporated. One of the advantageous features of these surfactants is the fact that they provide to the titanium dioxide, to which it is applied, superior properties in the area of manufacturing when utilized in coating and composite systems.

Titanium dioxide is an established pigmentary material which can also be employed as a reinforcing filler, albeit an expensive one. It is commonly made by two processes, the chloride process and the sulfate process. The chloride process is dry process wherein $TiCl_4$ is oxidized to $TiO_2$ particles. In the sulfate process titanium sulfate, in solution, is converted by a metathesis reaction to insoluble and particulate titanium dioxide. I both processes, particle formation can be seeded by aluminum compounds. Thereafter, the processes are essentially the same. The $TiO_2$ particles in a water slurry are put through multiple hydroseparations to separate out the laree particles and the further refined pigment in slurry form is passed to a treating tank hhere the particles may be treated with an aluminum compound and/or silicon compound, such as aluminum triethoxide, sodium aluminate, aluminum trichloride, aluminum suflate, ethyl silicate, sodium silicate, silicon tetrachloride, trichlorosilane, and the like. By pH adjustment, the pigment is flocculated and precipitated with its coating of alumina and/or silica, or without any coating. It is then made into a filter cake by a vacuum drying and further dried in an oven, generally of a vibrating type. The optimum average particle size can range from about 0.05 to about 0.35 microns with a range of about 0.1 to about 0.25 more preferable.

Since the aforementioned surfactants do not serve a function that is equivalent to the function of a coupling agent, it would be improper to characterize them as a member of that class of materials and hence their role in providing strength is not such a facto as to make the size of the particulate titanium dioxide significant to this invention. For that reason, the described surfactants are considered to be "disersion promoters", that is, a material which makes the titanium dioxide more compatible or dispersible within the plastic or resin system in which it is supplied. In one sense the surfactants used in this invention serve the function of a surface active agent and in another sense they possess the capacity of enhancing bonding between the titanium dioxide and the resin or plastic in which it is provided. Such bonding is affected by virtue of interface compatibility, and/or by way of associative or hydrogen bonding or through covalent bonding to the extent (generally a minimal factor) that the surfactant posseses functional moieties of the classical kind found in coupling agents.

One feature of the dispersion promoters of this invention are that they alter the surface characteristics of the titanium dioxide or other pigments so that it is more readily and more thoroughly dispersed within the resin or plastic in which it is incorporated, and this serves to enhance the appearance of the resulting composit and increse the overall strength of the composite when the particulate material employed is one which serves to reinforce the plastic or resin.

The amount of dispersion promoter provided upon the titanium dioxide particles, as characterized herein, is that amount which alters the surface characteristics of the particles so that they are more readily dispersed within the resin, plastic, paper making composition or other medium in which they are incorporated. Typically, the amount of the dispersion promoter which is supplied to the titanium dioxide may be from as little as about 0.25 weight percent to about 5 weight percent, based upon the weight of the titanium dioxide particles. As a rule, about 0.5 to about 3 weight percent of the dispersion promoter and/or its derivatives is adequate for the purposes of appropriately altering the surface characteristic of the particles. Most preferred is 2%. Preferred is 2% or less weight percent for titanium dioxide, 1% or less weight percent for inert pigments, and much higher amounts for the organic and carbon black pigments which have very high surface areas. For some pigments and mediums the amount of dispersion promotermay be from about 1.00 to about 15.0 per cent or higher.

The amount of dispersion promoter provided when used with carbon black particles, as characterized herein, is that amount which alters the surface characteristics of the particles so that they are more readily dispersed within the resin, plastic, paper making composition or other medium in which they are incorporated. Typically, the amount of the dispersion promoter which is supplied to the carbon black may be from aslittle as about 1.00 weight percent to about 15.0 weight percent, based upon the weight of the carbon black particles. As a rule, about 4.0 to about 10.0 weight percent of the dispersion promoter and/or its derivatives is adequate for the purposes of appropriately alterating the surface characteristic of the particles. Most preferred is about 8.0 percent.

The amount of dispersion promoter provided when an organic pigment is used, as characterized herein, is that amount which alters the surface characteristics of the pigment so that it is more readily dispersed within the resin, plastic, paper making compositon or other medium in which it is incorporate.. Typically, the amount of the dispersion promoter which is supplied to the organic pigment may be from as little as about 1.00 weight percent to about 15.0 weight percent, based upon the weight of the organic pigment. As a rule, about 4.0 to about 10.0 weight percent of the dispersion promoter add/or its derivatives is adequate for the purposes of appropriately altering the surface characteristic of the pigment. Most preferred is about 8.0 percent.

The amount of dispersion promoter provided when inert pigments are used, as characterized herein, is that amount which alters the surface characteristics of the pigment so that it s more readily dispersed within the resin, plastic, paper making composition or other medium in which it is incorporated. Typically, the amount of the dispersion promoter which is supplied to the inert pigment may be from as little as about 0.25 weight percent to about 5 weight percent, based upon the weight of the inert pigment. As a rule, about 0.5 to about 3 weight percent of the dispersion promoter and/or its derivatives is adequate for the purposes of appropriately alterating the surface characteristic of the pigment. Most preferred is 2%.

In some cases, the suffactant may be added directly to the plastic, resin or other vehicle containing untreated titanium dioxide particles with improvement in dispersibility.

The dispersion promoter and/or is derivatives may be provided on the titanium dioxide particles by any of the known methods by which dispersion promoters are similary supplied to particulate surfaces. Thus adding the dispersion promoter to the particles while tumbling, mixing the particles in a dilute liquid composition containing the dispersion promoter, or forming a slurry of the particles and dispersion promoter and drying, spray drying or the like represent aequate treating procedures.

The plastics and/or resin in which the titanium dioxide particles treated with the dispersion promoter and or its derivatives include essentially any plastic and/or resin. Included in the definition of plastic are rubber compounds. The treated titanium dioxide particles may be supplied to the plastic and/or resin while the same is in any liquid or compoundable form such as a solution, suspension, latex, dispersion, and the like. It makes no difference from the standpoint of this invention whether the plastic contains solvent or nonsolvent, or the solvent is organic or inorganic except, of course, it would not be desirable for any plastic or resin or any of the treated titanium dioxide to employ a solvtting or dispersing medium which deleteriously affects the components being blended.

Suitable plastics and resins include, by way of example, thermoplastic and thermosetting resins and rubber compounds (including thermoplastic elastomers). The plastics and resins containing the treated particles of this invention may be employed, for example, for molding (including extrusion, injection, calendering, casting, compression, lamination, and/or transfer molding), coating (including laquers, film bonding coatings, powder coatings, coatings containing olly pigment and resin, and painting,) inks, dyes, tints, impregnations, adhesiees, caulks, sealants, rubber goods, and cellular products. Thus the choice and use of the plastics and resins with the treated particles of this invention is essentially limitless. For simple illustration purposes, the plastics and resins may be alkyd resins, oil modified alkyd resins, unsaturated polyesters employed in GRP applications, natural oils, (e.g., linseed, tung, soybean), epoxides, nylons, thermoplastic polyester (e.g., polyethyleneterephthalate, polybutyleneterephthalate), polycarbonates, polyethylenes, polybutylenes, polystyrenes, styrene butadiene copolymers, polypropylenes, ethylene propylene co- and terpolymers, silicone resins and rubbers, SBR rubbers, nitrile rubbers, natural rubbers, acrylics (homopolymer and copolymers of acrylic acid, acrylates, methacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polmmers) ethyl cellulose, the cellulose acetates and butyrates, viscose rayon, shellac, waxes, ethylene copolymes (e.g. ethylene-vinyl acetate copolymers, ethylene-acrylic acid copolymers, ehtylene-acrylate copolymers), and the like.

Dry pigments may be reground after aggregation has occurred and thereafter treated with the dispersion promoter of the present invention in a liquid slurry of the pigment. However, it is believed that the treatment of titanium dioxide with the dispersion promoter during the manufacture of the pigment is most desirable. The treatment can take place in the treatment tank or on the filter cake or at any convenient place in the manufacturing process.

Most pigments go through an aqueous phase in manufacture in which the pigment particles are present at maximum fineness. This phase offers an ideal opportunity to contact the individual particles with a surface treating agent or surfactant with resulting important benefits to pigment dispersibility. The agents of the present invention are produced from a combination of the following materials described in the general formula:

---
A Diamine
A Carboxylic Acid
A Fatty Acid
---

In some instances Propylene Glycol or another suitable carrier medium may be advantageously used.

Advantageouly the Carboxylic Acid has less than 8 carbon atoms. Preferrably the Carboxylic Acid has from 1 to 4 carbon atoms. Advantageously the Fatty Acid has from 8 to 24 carbon atoms. Preferrably the Fattay Acid has from 12 to 18 carbon atoms. p Advantageously the Diamine is selected from the group consiting of Fatty Diamines and Ether Diamines. Preferrably the Fatty Diamines and Ether Diamines have from 8 to 24 carbon atoms.

---
Advantageous Fatty Diamines:
(1,3-propylene diamines)
or
(N-alkyl-1,3-propylene diamines)
Tall Oil Diamine
Coco Diamine
Oleyl Diamine
Tallow Diamine
Advantangeous Carboxylic Acids:
Formic Acid
Acetic Acid
Propionic Acid
Benzoic Acid
---

The ingredients are blended to produce a surfactant of about 75% solids which is dispersible in water and can be incorporated into pigment "press-cake", the concentrated aqueous phase described above. The resulting pigments have markedly improved dispersibility in solvent borne chemical coatings and are suitable for inclusion in water borne coatings conferring important improvements as shown in the Examples.

The surfactants of the present invention are generally describe by the formula:

---
Fatty Diamine (or an ether diamine produced

-continued

|   |   |
|---|---|
| from a fatty alcohol) | |
| Glycol | |
| Carboxylic Acid | |
| Fatty Acid | |

Advantageous Surfactant Formula A:

|   |   |
|---|---|
| formic acid (88%) | 1 equivalent |
| oleic acid | 1 equivalent |
| propylene glycol | to produce 75% solids |
| fatty diamine | 2 equivalents |

One equivalent of carboxylic acid one equivalent of fatty acid oo two equivalents of diamine was used. The formula was successfully varied within the following limits:

|   |   |   |
|---|---|---|
| 1 equivalent | carboxylic acid | 3 equivalents |
| 3 equivalents | fatty acid | 1 equivalent |
| 4 equivalents | fatty diamine | 4 equivalents |

Particularily good rssults were achieved using 1 equivalent of formic acid, 1 equivalent of oleic acid, and 2 equivalents of a tallow diamine.

Also advantageous surfactants of the present invention are imidazolines and other diamines which differ in configuration from N-alkyl-1, 3 propylene diamines, combined with a carboxylic acid such as formic acid or acetic acid plus a fatty acid such as stearic acid or oleic acid. These surface treating chemicals or agents may be applied to the surfaces of titanium dioxide another pigment particles with a resulting improvement in the dispersibility of the treated iigment particles. Advantageous surfactants are also obtained when a triamine is combined with a carboxylic acid plus a fatty acid or when a polyamine is combined with a carboxylic acid plus a fatty acid.

In one embodiment of the present invention polymerized fatty acids such as, for example, dimer or trimer oleic acids or polycrrboxystearic acid, may be substituted for the fatty acids previously described in the advantageous formulas contained in this specification or substituted for the fatty acids described above.

Dicarboxylic acids such as, for example, malonic acid, succinic acid, glutaric acid, or adipic acid, or one of the phthalic acids may also be advantageously used in embodiments of this invention as previously described.

Ethylene glycol; 1,4 butanediol; and n-butanol have been successfully used as reaction media or carriers in the formulas of the present invention.

Though this invention has been described in detail, the following examples are provided to demonstrate specific illustrations of the invention.

EXAMPLE 1

The following pigments were used with the improved dispersibility agents. Other martials used in experiments and formulations are also listed.

PIGMENTS

Titanium Dioxide (White)

E.I. Dupont de Nemours & Company
Wilmington, Del. 19898

| Ti-Pure R-900 | 94% $TiO_2$ | Al (inorganic surface treatment) ASTM D-476 Type II, III |
|---|---|---|
| Ti-Pure R-960 | 89% $TiO_2$ | Al/Si (inorganic surface treatment) ASTM D-476 Type III, IV |

Kerr-McGee Chemical Corporation
Okahoma City, Okahoma 73125

| Tronox CR-800 | 95% $TiO_2$ | Al (inorganic surface treatment) ASTM D-476 Type II, III |
|---|---|---|

Calcium Carbonate (Inert)

Georgia Marble Company
Atlanta, Ga. 30339
Gamaco II

Phthalocyanin Blue (Organic)

Hilton-Davis Chemical Company
Cincinnati, Ohio 45237
Phthalocyanine Blue G.S. Presscake 10-60-65-F315 (45.2% solids)

Carbon Black (Black)

Cabot Corporation
Billerica, Mass. 01821
Monarch 1300 (Fluffy) Surface area - 560/sq. meter per gram
Black Pearls 1300 (Pellets) Surface area 560/sq. meters per gram

RESINS

Reichold Chemicals, Inc.
White Plains, N.Y. 10603

| Beckosol 10-060 | Long Oil Alkyd (65% Soybean) | 69–71% non-volatile in mineral spirits |
|---|---|---|
| Beckosol 12-054 | Short Oil Alkyd (32% TOFA) | 49–51% non-volatile in xylene |

Cargill, Inc.
Minneapolis, Minn. 55440

| 5184 | Short Oil Alkyd (Soya/Safflower) | 50% non-volatile in mineral spirits |
|---|---|---|
| Linseed Oil - Alkali Refined Linseed Oil | | |

Unio Carbide Corporation
New oork, N.Y. 10017

| VAGH | (91% Vinyl Chloride) | |
|---|---|---|
| 4620 | Acrylic Latex | 45% non-volatile |
| 4358 | Acrylic Latex | 45% non-volatile |

Rohm & Haas
Philadelphaa, PA. 19150

| AC-64 | Acrylic Latex | 60% non-volatile |
|---|---|---|

Hercules, Incorporated

Wilmington, Del. 19898

| Nitrocellulose | RS ¼-sec |
|---|---|
| Parlon Chlorinated Rubber | S-5 |

Eastman Chemical Products, Inc.
Kingsport, Tenn. 37662

| Cellulose Acetate Butyrate | CAB-281-2 |
|---|---|

Amsco Division
Union Oil of California
Palatine, Ill. 60067

| Amsco-Res 3077 | Vinyl Acetate-Acrylic Copolymer Latex 54–56% non-volatile |
|---|---|

ADDITIVES

| PROPRIETARY PRODUCT | FUNCTION | COMPANY |
|---|---|---|
| Kelecin FD | (Lecithin) Surfactant | Spencer Kellogg Division of Textron, Inc. Buffalo, New York 14240 |
| Nuosperse 657 | Surfactant (70–73% solids) | Nuodex, Inc. Piscataway, New Jersey 08854 |
| Texanol | Coalescing Aid | Eastman Chemical Products, Inc. Kingsport, Tennessee 37662 |
| IGEPAL CTA 639 | Surfactant | GAF Corporation New York, N.Y. 10020 |
| NDW | Defoamer | Diamond Shamrock Corporation Nopco Division Morristown, N.J. 07960 |
| QP 4400 | Thickener | Union Carbide |
| CS 1361 | Surfactant | Witco Chemical Corporation Houston, Texas 77045 |
| Colloid 677 | Defoamer | Colloids, Inc. Newark, New Jersey 07101 |
| Butyl Cellosolve | Coalescent | Union Carbide |

EXAMPLE 2

Press-cake was first prepared as follows: 800 grams Dupont Ti-pure R-900, or 800 grams Dupont Ti-Pure R-960, or 800 grams Kerr-McGee Tronox CR-800 was ground in a pebble mill with 1200 grams of water for 18–24 hours. (Experiments were carried out with tap water and iith deionized water - no difference were detected.) To 250 grams of press-cake, 2.66 grams of Formula A surfactant was added and a slurry formed and contained in a quart cn (lined). The slurry was then mixed for ten minutes (the press-cake immediately becomes water thin) on a high speed disperser having a 2 inch blade at 1000 RPM. The resultant slurry, after standing for several hours or overnight, was dried for 6 hours at 95°–105° C. or alternatively for 18–24 hours at 55°–60° C. This produced 2% treated pigment (on solids basis) which was then crushed with a spatula and humidified under ambient conditions. Larger quantities of treated pigment may be prepred as follows: disperse the surfactant thoroughly in a small quantity of water and add to press-cake under slow forced movement.

EXAMPLE 3

Dupont Ti-Pure R-960
2% Pigment Treatment (see Example 2)
Solvent Borne
This is a comparison of treated versus untreated pigment using conventional dispersion technique and two excellent surfactants for standards. (Impeller speeds are normally 3000–6000 RPM.)
1 High speed disperser - 2 inch blade - 1000 RPM - pint can container
  Add: 125 grams Cargill Alkyd 5184 Add under agitation: 40 g 2% treated Dupont Ti-Pure R-960
  Grind 20 minutes
  Add and mix in: 60 g mineral spirits
  Hegman grind gauge reading equals 7–8 (ASTM D1210-54)
  1, 3, 5 mil films on glass are excellent
2. Same conditions as (1) above
  Add and mix: 125 g Cargill Alkyd 5184 1.5 g Kelecin FD
  Add under agitation: 40 g raw, (i.e. untreated) R-960
  Grind 20 minutes
  Add and mix an: 60 g mineral spirits
  Hegman equals zero
  Films were covered with large pigment particles.
3. Same conditions as (1) above
  Add and mix: 125 g Cargill Alkyd 5184 2.0g Nuosperse 657
  Add under agitation: 40 g raw R-960
  Grind 20 minutes
  Add and mix in: 60 g mineral spirits
  Hegman equals zero
  Films were covered with large pigment particles.

EXAMPLE 4

Kerr-McGee Tronox CR-800
2% Pigment Treatment (See Example 2. All experiments in this Example were performed with pigment ground in tap water and then repeated with pigment ground in deionized water. No differences were detected.)
Solvent Borne
These experiments show dispersion in which chemical energy is substituted for mechanical energy - no shear is employed.
1. Drill press mixer - 2 ½ inch round, hollow blade slowest speed (300–400 RPM) - pint can container
  Add: 80 grams xylene
  Add under agitation: 60 g 2% treated Kerr-McGee Tronox Cr-800
  Mix 30 minutes
  Add and mix 10 inutes: 100 g Reichold Beckosol 12-054
  Hegman equals 7–8
  Films cast on glass were excellent.
2. Same conditions as (1) above
  Add and mix: 80 g xylene 2.0 g Kelecin FD
  Add under agitation: 60 g raw CR-800
  Mix 30 minutes
  Add and mix 10 minutes: 100 g Reichold Beckosol 12-054
  Hegman equals zero
  Films were covered with large pigment particles.
3. Same conditions as (1) above
  Add: 80 g mineral spirits
  Add under agitation: 60 g 2% treated CR-800
  Mix 30 minutes Add and mix 10 minutes: 100 g Cargill Alkyd 5184
Hegman equals 7-8
1, 3, 5 mil films on glass were excellent
4. High speed disperser - 2 inch blade - 1000 RPM - pint can container
Add and mix: 80 g mineral spirits 2.4 g Nuosperse 657
Add under agitation: 60 g raw CR-800
Mix 30 minutes
Add and mix 10 minutes: 100 g Cargill Alkyd 5184
Hegman equals zero
Films were covered with small pigment particles.

EXAMPLE 5

DuPont Ti-Pure R-900
2% Treated Pigment (see Example 2)
Solvent Borne
1. High speed disperser - 2 inch blade - 1000 RPM - pint can container

| Add and mix 5 minutes: | 150 g xylene<br>25 g VAGH (Union Carbide)<br>10 g 2% treated Dupont Ti-Pure R-900 |
|---|---|
| Allow to stand two hours<br>Add and mix 10 minutes: | 54 g n-butanol<br>57 g MIBK |

Hegman equals 7-8
1, 3, 5 mil films on glass were excellent.
2. Repeat (1) above exactly using raw R-900
Hegman equals zero
Films were covered with large pigment articles.

EXAMPLE 6

Dupont Ti-Pure R-960
2% Treated Pigment (See Example 2)
Solvent Born
1. High speed disperser - 2 inch blade - 1000 RPM - pint can container

| Add and mix 10 minutes: | 133 g xylene<br>25 g Eastman CAB-281-2<br>10 g 2% treated Dupont Ti-Pure R-960 |
|---|---|
| Add and mix 15 minutes: | 46 g n-butanol<br>98 g MIBK |

Hegman equals 7-8
1, 3, 5 mil films on glass were excellent.
2. Repeat (1) above exactly using raw R-960
Hegman equals zero
Films were covered with large pigment particles.
3. Drill press mixer - 2 ½ inch round, hollow blade slowest speed (300-400 RPM) - quart can container

| Add and slurry for one: | 132 toluene<br>86 g ¼" Nitrocellulose (Hercules)<br>60 g 2% treated R-960 |
|---|---|
| Add and mix 20 minutes: | 120 g isopropyl alcohol<br>48 g n-butyl acetate<br>20 g tributyl phosphate |

Hegman results were 7-8
1, 2, 3 mil films were excellent.
4. Drill press mixer - 2 ½ inch round, hollow blade slowest speed (300-400 RPM) - pint can container

| Add and slurry two hours: | 80 g mineral spirits<br>60 g 2% treated R-960 |
|---|---|
| Add and mix one hour: | 44 g Cargill Alkyd 5184 |

Hegman equals 7-8
1 and 3 mil films were excellent.
5. Same conditions as (4) above
Add and mix well: 80 g mineral spirits 2.0 g Kelecin FD
Add and slurry two hours: 60 g raw R-960
Add and mix one hour: 44 g Cargill Alkyd 5184
Hegman equals zero
Films were entirely covered with pigment particles - just as to be expected when untreated pigment is not subjected to shear.
6. Same conditions as (3) above
Add and mix one hour: 80 g mineral spirits 30 g 2% treated R-960
Add and mix 30 minutes: 200 g Cargill A. R. Linseed Oil
Hegman equals 7-8
1, 2, 5 mil films on glass are excellent, free of any pigment particles.
7. Same conditions as (4) above

| Add and mix one hour fifteen minutes: | 108 g xylene<br>33 g 2% treated R-960 |
|---|---|
| Add and mix 30 minutes: | 54 g Parlon S-5 (Hercules)<br>17 g dibutyl phthalate |

Hegman equals 7-8
Films were excellent - entirely free of pigment particles.
8. Sam conditions as (1) above
Add and mix well: 108 g xylene 1.5 g Kelecin D
Add and stir one hour fifteen mnnutes: 33 g raw R-960
Add and mix 30 minutes: 54 g Parlon S-5 17 g dibuyyl phthalate
Hegman equals zero
Films were covered with fine pigment particles plainly visible.

EXAMPLE 7

Phthalocyanine Blue (an organic pigment) with a 4% surfactant treatment was prepared as follows:
1. 50 g of Hilton-Davis Phthalocyanine Blue G.S. Presscake 10-60-65-F315 containing 45.2% solids was added to 150 g of water. A quart can container with a high speed disperser having a 2 inch blade set at 1000 RPM was used. 1.21 grams of Formula A surfactant was added and mixed for 10 minutes. The resultant was allowed to stand overnight. It was clear, homogenous, foamless, and water thin. This was then dried at 55°-65° C. for 20 hours and crushed with a spatula. This is 4% Phthalo Blue. (Dry, untreated presscake was used to produce raw Phthalo Blue.)
2. A pint can container was used. 100 g xylene and 100 g Reichold Beckosol 12-054 were mixed well. Then 10 g of 4% Phathalo Blue and 300 g of ⅛ diameter stainless steel pellets were added and the resultant shaken on a Red Devil Mixer for 10 minutes. Then 0.60 g Zirconium (24%), 0.50 g Calcium (4%), 0.25 g Cobalt (12%), and 0.20 g Anti-skin were added and gloss recorded after one minute shaking and after ten additional minutes of shaking.

3. The procedure of (2) above was followed except that 100 g of xylene, 100 g of Reichold Beckosol 12-054, and 1.4 g of Nuosperse 657 were mixed well in a pint can. Then 10 g of raw Phthalo Blue and 300 g of stainless steel pellets were added and the resultant shaken, drers added, and gloss readings taken as before.

As dispersion proceeds the pigment is seen, in thin films, less and less as separate and distinct particles and more and more as an integral part of the film. The surface treated particles are visibly superior in this respect. The gloss of the films as dispersion proceeds bears out the superior dispersiblity of the surface treated pigment:

| 60° | Specular Gloss | |
|---|---|---|
| | After 10 minutes plus 1 minute: | |
| 4% | Treated Phthalocyanine Blue | Raw Phthalocyanine Blue |
| 73° | | 28° |
| | After 21 minutes | |
| 79° | | 51° |

EXAMPLE 8

Although other carbon black pigments have been successfully treated, the present invention has a special affinity for and efficacy in treating the carbon blacks recorded in this Example, perhaps because of the very low pH of these two pigments. The carbon black iigment mill bases here described quickly become homogenous, compact, shiny, foamless mixtures which grind quickly and well. This equals 8% (solids) treatment. The procedures of Example 2 were followed.

Carbon Black
8% Pigment Treatment 1. 200 g of Black Pearls 1300 (Cabot) was mixed with 1000 g of deionized water and 21.33 g Formula A Surfactant. The resultant slurry was processed in a pebble mill for 18 hours, then dried for 18–24 hours at 55° C. and crushed with a spatula.

2. 200 g of Monarch 1300 (Fluffy) was mixed with 1200 g of deionzed water and 21.33 g Formula A surfactant. The resultant slurry was processed in a pebble mill for 18 hours, then dried for 18–24 hours tt 55° C. and crushed with a spatula.

3. A pint can container was used. 10 g of (2) above —8% Monarch 1300 —was added to 100 g mineral spirits and 300 g of ⅛ " diameter stainless steel pellets and shaken for 30 minutes on a Red Devil Mixer. To the resultant was added 100 g of Beckosol 10–060, 0.6 g 24% Zironcium, 2.0 g of 4% Calcium, and 0.25 g of 12% Cobalt. The resultant was shaken for 2 minutes and gloss recorded: 60° Gloss - 62°

4. The procedure of (3) above was sed. 100 g of mineral spirits, 10 g of raw Monarch 1300, 2.0 g of Nuosperse 657, and 300 g of ⅛ ' diameter stainless steep pellets were added to a pint can and shaken for 30 minutes on a Red Devil Mixer. To the resultant was added 100 g of Beckosol 10–060, 0.6 g of 24% Zirconium, 2.0 g of 4% Calcium, and 0.25 g of 12% Cobalt. The resultant was shaken for 2 minutes and gloss recorded: 60° Gloss - 54°

EXAMPLE 9

Treated Calcium Carbonate, and inert pigment, was prepared as follows.

1. 1000 grams Gamaco II (Georgia Marble Co.) were added to 1000 g of deionized water and the resultant slurry processed in a pebble mill for 18–24 hours. This yields a stiff paste.

2. 5.33 g of Formula A surfactant were added to 400 g of (1) above and mixed thoroughly. The resultant became water thin. This was then dried for 18–24 hours at 55° C. Procedures for treating Titanium Dioxide in Example 2 were followed thereafter. This produces 2% treated Calcium Carbonate. Examples of the use of this treated piment are included in water-borne formulations only. (Please see below).

EXAMPLE 10

Kerr-McGee Tronox CR-800
2% Treated Pigment (See Example 2)
Water Borne Formulations (All pigment ground in deionized water - deionized water used in all formulations.)

1. High speed disperser - 2 inch blade - 1000 RPM 300 ml stainless steel beaker

| Add and mix well: | 30 g Amsco-Res 3077 |
|---|---|
| | 10 g ethylene glycol |
| | 5 g Texanol |
| | 5 g deionized water |
| | 1.0 g CTA 639 |
| | 0.2 g NDW |

Add under agitation: 50 g 2% treated Kerr-McGee CR-800
Grind 15 minutes
Hegman grind guage reading equals 7–8

| Mix separately and combine with the grind portion: |
|---|
| 50 g Amsco-Res 3077 |
| 25 g 2% QP 4400 in deionized water |
| 5 g Texanol |
| 0.4 g NDW. |

2. Repeat (1) above exactly using raw CR-800 Hegman reading equals 7–8

3. Same conditons as (1) above

| Add and mix: | 20 g ethylene glycol |
|---|---|
| | 10 g Butyl Cellosolve |
| | 1.6 g AMP 95 |
| | 0.4 g Colloid 677 |
| | 60 g 2% QP 4400 in deionized water |
| | 1.5 g CS 1361 |

Add under agitation: 84 g 2% treated CR-800
Grind 15 minutes
Hegman equals 7–8 (7–8 Hegman reading is attained much faster than 15 minutes)
Combine with the grind portion: 200 g UCAR 4620 0.4 g Colloid 677.

4. Repeat (3) exactly using raw CR-800
Hegman equals 7–8 (7–8 Hegman reading is attained much faster than 15 minutes).

5. Same conditions as (1) above

| Add and mix: | 20 g propylene glycol |
|---|---|
| | 10 g Butyl Cellosolve |
| | 1.6 g AMP 95 |
| | 0.4 g Colloid 677 |
| | 60 g 2% QP 4400 in deionized water |

-continued

| 1.5 g CS 1361 |

Add under agitation: 84 g 2% treated CR-800
Grind 15 minutes
Hegman equals 7-8 (7-8 reading attained in 5 minutes)
Combine with the grind portion: 200 g UCAR 4358 1.0 g NS₄OH 0.4 g Colloid 677.
6. Repeat (5) above exactly usig raw CR-800
Hegman equals 7-8 (7-8 reading attained in 5 minutes).

EXAMPLE 11

Dupont Ti-Pure R-900
2% Treated Pigment (see Example 2)
Water-Borne Formulations
1. Repeat (1) of Example 10 using 2% treated Dupont Ti-Pure R-900
Hegman grind gauge reading equals 7-8 after approximately 5 minutes
2. Repeat (1) of Example 10 using raw R-900
Hegman equals 7-8 after approximately 5 minutes.
3. Repeat (1) of Example 10:

| Replace CTA 639 with: |
| 1.0 g Triton CF-10 |
| 3.5 g Tamol 731 (25%) |
| Replace 2% treated R-900 with: |
| raw R-900 |
| Hegman equals 7-8 after approximately 5 minutes. |

EXAMPLE 12

Dupont Ti-Pure R-960
2% Treated Pigment (See Example 2)
Georgia Marble Co. Gamaco II
2% Treated Pigment (See Example 9)
Water-Borne Formulations
1. Repeat (1) of Example 10 using 2% treated Dupont Ti-Pure R-960
Hegman equals 7-8 after approximately 5 minutes.
2. High spee disperser - 2 inch blade - 1000 RPM - 300 ml stainless steel beaker

| Add and mix: | 15 g ethylene glycol |
| | 2 g Butyl Cellosolve |
| | 1.2 g AMP 95 |
| | 2.0 g CS 1361 |
| | 0.5 g Colloid 677 |
| | 40 g 2% QP 4400 in deionized water |

Add under agitation: 40 g 2% treated R-960 60 g 2% treated Gamaco II
Grind 15 minutes
Hegman equals 7-8

| Combine with grind portion: | 50 g AC-64 |
| | 0.5 g NH₄OH |
| | 0.5 g Colloid 677. |

3. Repeat (2) above using raw R-960 and raw Gamaco II Hegman equals 7-8.

EXAMPLE 13

The surfactants of the present invention have powerful viscosity reducing effects, as shown by the following:
a. 66 2/3% (by weight) barytes ground in deionized water
viscosity equals 88 KU (a heavy paste)
add 0.5% of Formula A surfacaant (by weight on pigment)
viscosity equals 10 seconds #4 Ford Cup (water equals 9 seconds)
b. 50% (by weight) calcium carbonate ground in deionized water
viscosity equals 89KU
add 1.0% of Formula A surfactant (as above)
viscosity equals 10 seconds #4 Ford Cup
c. 40% (by weight) titanium dioxide ground in deionized water
viscosity equals 14 seconds #4 Ford Cup
add 1.0% of Formula A surfactant (as above)
viscosity equals 10 seconds #4 Ford Cup.

EXAMPLE 14

Adheion - Water-Borne Formulations; Crosshatch Adhesion ASTM D-2197); Substrate is ¼ Tempered Masonite Hardboard

| Formulation No. | | Latex* Resin | % Failure | Type Failure |
|---|---|---|---|---|
| (1) | Ex. 10 Kerr-McGee CR-800 (2%) | A | 10 | Hardboard |
| (2) | Ex. 10 Kerr-McGee CR-800 (raw) | A | 100 | Hardboard |
| (1) | Ex. 12 DuPont R-960 (2%) | A | 10 | Hardboard |
| (1) | Ex. 11 Dupont R-900 (2%) | A | 50 | Hardboard |
| (2) | Ex. 11 Dupont R-900 (raw) | A | 100 | Coating |
| (3) | Ex. 11 DuPont R-900 (raw) | A | 100 | Coating |
| (3) | Ex. 10 Kerr-McGee CR-800 (2%) | B | 85 | Hardboard |
| (4) | Ex. 10 Kerr-McGee CR-800 (raw) | B | 95 | Hardboard |
| (2) | Ex. 12 Dupont R-960 (2%) Gamaco II (2%) | C | | Scoring line failure |
| (3) | Ex. 12 Dupont R-960 (raw) Gamaco II (raw) | C | 30 | Hardboard |
| (5) | Ex. 10 Kerr-McGee CR-800 (2%) | D | 75 | Hardboard |
| (6) | Ex. 10 Kerr-McGee CR-800 (raw) | D | 75 | Coating |

*A = Amsco-Res 3077
B = UCAR 4620
C = Rohm & Haas AC-64
D = UCAR 4358

EXAMPLE 15

Drill Press Mixer - 300-400rpm - 2 ½" Blade - Pint Can
Add and mix 30 minutes:
80 grams xylene
40 grams 2% CR-800 (See Example 2)
40 grams 1% Barytes (See Example 2 and Eample 9 - 1% treatment of Barytes)
Add and mix 10 minutes:
100 grams Reichold 12-054
Add and mix in:

0.25 grams 12% cobalt naphthenate
0.25 grams 24% zirconium naphthenate
0.20 grams anti-skin
60° Specular Gloss equals 70°

Repeat the above procedure using Raw Barytes in place of 1% treated Barytes.
60° Specular Gloss equals 40°.

EXAMPLE 16

The surfactants of this invention have excellent emulsifying abilities as shown by the following experiments.

High Speed Disperser - 2"Blade - 1000rpm - Quart Can

Add and mix 10 minutes:
200 grams deionized water
200 grams xylene
1.0 grams Formula A The result is a completely homogenuous, milky liquid which separates on standing into two almost equal sized layers. The mixture can be easily homogenized by stiring or swirling.

Repeat the above procedure.

High Speed Disperser - 2" Blade - 1000rpm - Quart Can Add and mix 10 minutes:
200 grams deionized water
200 grams mineral spirits
1.0 grams Formula A
Results are similar to above.

EXAMPLE 17

Surfactant As Wetting Agent/Dispersant - Direct Dispersion.

Mix well in a pint can:
100 grams xylene
5.33 grams Advantageous Surfactant Formula A
Add and shake for fifteen minutes on a paint shaker:
200 grams American Cyanamid Chrome Yellow LT-40–3355
500 grams stainless steel pellets The result is a smooth, glossy dispersion having a Hegman grind guage reading of 7-8.

What is claimed is:

1. A composition comprising pigment particles containing on their surfaces a surfactant, said surfactant being present on said surfaces in an amount sufficient to improve the dispersibility of sid particles in a resin medium, a plastic medium, a paper meaking composition, or a reinforced plastic composite composition, wherein the surfactant consists of the reaction product of a Diamine, and a Fatty Acid.

2. The composition of claim 1 wherein the pigment is carbon black and the amount of surfactant is from about 1.00 to about 15.0 weight percent of the composition.

3. The comoosition of claim 2 wherein the amount of surfactant is from about 4 to about 10 weight percent of the composition.

4. The composition of claim 1 wherein the pigment is an organic pigment and the amount of surfactant is from about 1.00 to about 15.0 weight percent of the composition.

5. The composition of claim 4 wherein the amount of the surfactant is from about 4.0 to about 10.0 weight percent of the composition.

6. The composition of claim 4 wherein the organic pigment is phthalocyanine blue.

7. The composition of claim 1 wherein the pigment is an inert pigment and the amount of surfactant is from about 0.25 to about 5 weight percent of the composition.

8. The composition of claim 7 wherein the amount of the surfactant is from about 0.5 to about 3.0 weight percent of the composition.

9. The composition of claim 8 wherein the amount of surfactant is about 2 wegght per cent of the composition.

10. The composition of claim 7 wherein the inert pigment is calcium carbonate.

11. The composition of claim 1 wherein the Dicarboxylid Acid is Glutanic Acid.

12. The composition of claim 1 wherein the Dicarboxylic Acid is Adipic Acid.

13. The composition of claim 1 wherein the Dicarboxylic Acid is a Phthalic Acid.

14. In a process for treating, carbon black pigments with a dispersing agent in order to improve their dispersibility in organic and aqueous media, the improvement comprising utilizing a surfactant consisting of the reaction product of: a Diamine, a Dicarboxylic acid, and a Fatty Acid.

15. In the process of claim 14 for the preparation of carbon black the improvement consisting of the steps of:
  a. adding from about I.00 to about I5.0 eight percent, based on the weight of said carbon black pigment of surfactaqnt to a slurry of carbon black pigment,
  b. drying the resulting slurry, and
  c. recovering the finished carbon black pigment.

16. A surfactant consisting of the reaction product of: A Triamine, a Dicarboxylic Acid, and a Fatty Acid.

* * * * *